Aug. 26, 1952     H. F. HOBBS     2,608,275
POWER TRANSMISSION APPARATUS
Filed Dec. 10, 1946
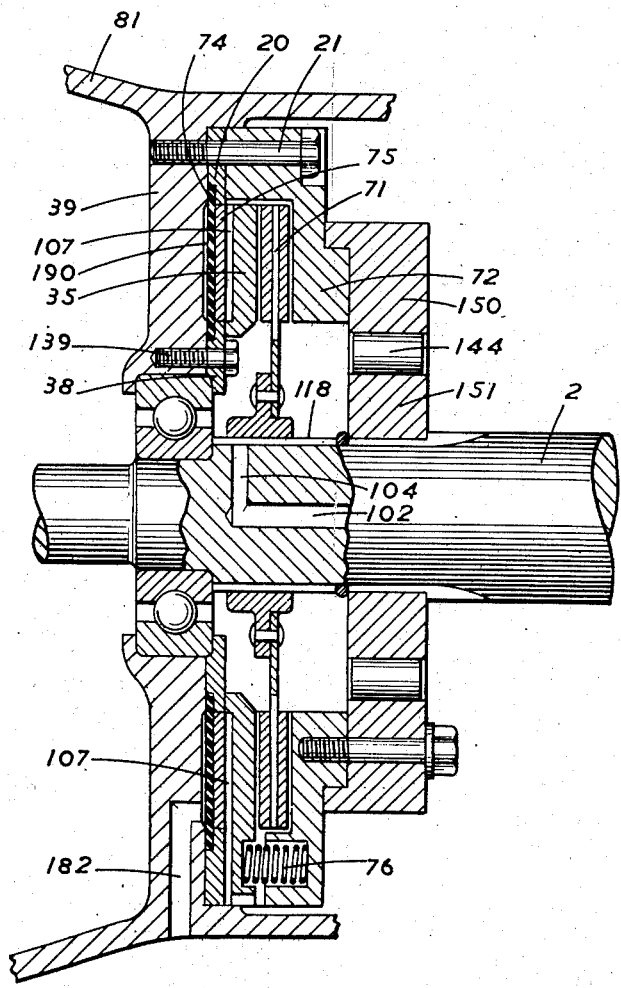
Inventor
HOWARD FREDERICK HOBBS
By
Young Emery + Thompson
Attorneys Patented Aug. 26, 1952

2,608,275

UNITED STATES PATENT OFFICE 2,608,275

POWER TRANSMISSION APPARATUS

Howard Frederick Hobbs, Leamington Spa, England, assignor to Hobbs Transmission Limited, London, England, a British company Application December 10, 1946, Serial No. 715,206
In Great Britain December 13, 1945

1 Claim. (Cl. 188—152)

This invention relates to power transmission mechanism of the kind having gearing in which one or more reaction elements requires to be held in order to make the gearing operative in the appropriate ratios.

An object of this invention is to provide a brake of simple construction requiring relatively low fluid operating pressures.

Another object of this invention is to provide a brake occupying little space and a number of brakes arranged in one unit, which is particularly adaptable for use in variable ratio transmission gears.

A further object is to provide a track, the surfaces of which are lubricated when disengaged and a construction provides for the removal of lubricant during the engaging action, which ensures smooth engagement without the need for skill in operation.

The invention will now be described by way of example with reference to the accompanying single figure of the drawing which is a vertical sectional view of a reaction brake made in accordance with the invention.

The apparatus has a fixed housing 81 and a shaft 2 which may be a shaft of a transmission gearing.

A friction plate 71 of a brake is carried on a spline 118.

The housing 81 has an axially stationary part 39 on one side of the plate 71 which part has a space 190 sealed off partly by an elastic diaphragm 74 the area of this sealed space being at least as large as the area of any one of the friction surfaces. An axially movable presser plate 35 is disposed between the diaphragm and the friction plate. A heat insulator plate 75 is disposed between the diaphragm and the presser plate. Oil pressure admitted to the space 190 deforms the diaphragm and applies pressure through the insulator plate and presser plate on to the friction plate. Oil under pressure can be admitted from a suitable valve not shown and through channel 182 to the space 190. The presser plate is normally held disengaged by springs 76. The inner edge of the diaphragm is clamped by a ring 38 which is fixed by bolts 139 to the part 39 and the presser plate abuts against this ring when in the disengaged position. Lubricating oil is allowed to reach the disengaged friction surfaces from the oil channel 102 and duct 104. When the brake is disengaged the presser plate seals against the ring 38 and prevents or limits escape of oil between them thereby diverting the oil on to the friction surfaces of the friction plate. When the brake is in the engaged position the presser plate is moved away from the ring 38 thus enabling the oil to escape through grooves 107 provided between the presser plates and the insulator plates said grooves being formed in the presser plates or insulator plates or both. The friction surfaces are preferably made either perfectly parallel or slightly tapered so that the inner diameters seal as soon as the brake is engaged, thus assisting to shut off entry of lubricating oil.

The outer perimeter is sealed by a ring 20 which is clamped to the part 39 by bolts 21 which bolts also carry a plate 72.

A roller bearing or freewheel detent comprises rollers 144 operatively disposed between an outer member 150 which is fixed to the stationary plate 72 and the inner member 151 which is connected to the shaft 2 by the splines 118.

The construction as shown can be usefully employed to take a relatively high reaction torque in a transmission gear, the brake 71 serving to carry any overrun torque and the detent 144 serving to carry the high reaction torque. If the brake 71 should be made large enough to carry the whole of the torque then it would be possible when applied to a vehicle for example, to cause unpleasant and dangerous overrun torque by suddenly changing from a low ratio to a high ratio. The brake 71 can be of sufficient capacity only to deal with such a sudden increase in load in a very gradual manner whilst the detent 144 is capable of instantly carrying the normal reaction load to produce the necessary torque transmission.

I claim:

A hydraulically operated brake for holding stationary and freeing a reaction element comprising a rotary friction plate having friction surfaces, a fixed carrier member, a non-rotary plate carried by the carrier member and disposed on one side of the friction plate, a presser plate disposed on the other side of the friction plate, an elastic diaphragm forming a sealed space with the carrier member, an insulator plate arranged between the presser plate and the diaphragm, at least one of the juxtaposed surfaces of the presser plate and the insulator plate, having grooves therein, positioned to receive oil in the brake engaged position, an abutment positioned for engagement by the presser plate in the brake-disengaged condition, means for supplying oil under pressure to the sealed space in order to press the insulator plate against the presser plate so that the presser plate presses against the rotary friction plate and engages the latter against the non-rotary plate, means having an oil feed duct adapted to lubricate the friction surfaces, said duct opening within the inner diameter of the presser plate, and spring means to disengage the friction plate and to hold the presser plate against the abutment.

HOWARD FREDERICK HOBBS.

REFERENCES CITED

The following references are of record in the file of this patent:

UNITED STATES PATENTS

| Number | Name | Date |
|---|---|---|
| 670,948 | Carlson | Apr. 2, 1901 |
| 795,207 | Eastwood | July 18, 1905 |
| 854,720 | Dawson | May 28, 1907 |
| 1,562,133 | Woodbury | Nov. 17, 1925 |
| 1,928,301 | Pierson | Sept. 26, 1933 |
| 1,998,811 | Heaton | Apr. 23, 1935 |
| 2,076,532 | Francoeur et al. | Apr. 13, 1937 |
| 2,148,818 | Kattwinkel | Feb. 28, 1939 |
| 2,254,335 | Vincent | Sept. 2, 1941 |
| 2,370,360 | McLean et al. | Feb. 27, 1945 |
| 2,498,123 | Hobbs | Feb. 21, 1950 |
| 2,535,924 | Hobbs | Dec. 26, 1950 |

FOREIGN PATENTS

| Number | Country | Date |
|---|---|---|
| 742,120 | France | Dec. 21, 1932 |
| 6,724 | Great Britain | 1899 |
| 232,144 | Germany | Mar. 7, 1911 |
| 243,557 | Germany | Feb. 16, 1912 |
| 579,061 | Germany | June 21, 1933 |
| 87,082 | Switzerland | Nov. 1, 1920 |